United States Patent [19]
Peters

[11] 3,973,896
[45] Aug. 10, 1976

[54] BLOW MOLDING APPARATUS

[75] Inventor: Donald L. Peters, Bartlesville, Okla.

[73] Assignee: Phillips Petroleum Company, Bartlesville, Okla.

[22] Filed: June 12, 1975

[21] Appl. No.: 586,318

[52] U.S. Cl. .................. 425/387 B; 425/DIG. 204; 425/290; 264/89; 264/90; 264/98
[51] Int. Cl.² ........................................ B29D 23/03
[58] Field of Search .............. 425/DIG. 204, 387 B, 425/290; 264/89, 94

[56] References Cited
UNITED STATES PATENTS

| | | | |
|---|---|---|---|
| 3,272,681 | 9/1966 | Langecher | 156/518 |
| 3,305,891 | 2/1967 | Nozaki | 264/99 X |
| 3,342,916 | 9/1967 | Peters | 264/98 |
| 3,450,805 | 6/1969 | Chesser | 264/28 |
| 3,488,801 | 1/1970 | Hariely | 425/DIG. 204 |
| 3,492,106 | 1/1970 | Peters et al. | 65/82 |
| 3,500,497 | 3/1970 | Culpepper | 425/DIG. 204 |
| 3,764,644 | 10/1973 | Robinson | 264/89 |

FOREIGN PATENTS OR APPLICATIONS

| | | | |
|---|---|---|---|
| 1,475,911 | 2/1967 | France | 264/98 |
| 38-11831 | 11/1963 | Japan | 264/94 |

*Primary Examiner*—Richard B. Lazarus

[57] ABSTRACT

An apparatus for blow molding including a blow mold having mold halves which are relatively movable and receive a parison therebetween. A mandrel is carried by portions of the mold and is movable between an extended position and a retracted position. The mandrel has a free end with a vacuum surface area portion with the end being engageable with the parison when the mandrel is in its extended position. A blow needle is reciprocably mounted in the mandrel and insertion of same into the parison is facilitated by the parison being held against the end of the mandrel by vacuum.

6 Claims, 4 Drawing Figures

BLOW MOLDING APPARATUS

The present invention relates to a blow molding apparatus which has means to facilitate puncturing of a parison by a blow needle. In the past, parisons used for blow molding have very little rigidity and therefore pose problems for the puncturing of same by a blow needle. Because of the lack of rigidity and thereby support, the blow needle could either push the parison aside or forward and thereby prevent puncturing of same which would then result in a scrap part because same would be unblown. One method of helping to reduce unblown or partially blown parts was to introduce air into the parison before attempting to puncture same with the blow needle which is commonly referred to as "pre-blow". The pre-blown parison then would have increased rigidity and support to improve puncturing of same with a blow needle. This method, though, did pose some problems as, for example, timing of the pre-blow relative to movement of the blow needle for puncturing the parison, was important to assure consistent blown articles.

The principal objects and advantages of the present invention are: to provide a blow molding apparatus, using a blow needle, with means to support a parison to facilitate insertion of the blow needle through the parison; to provide such an apparatus wherein the means providing support for the parison has a vacuum surface area portion which holds a portion of the parison to facilitate puncturing of the parison by a blow needle; to provide such an apparatus which provides consistent punctures of the parison; to provide such an apparatus which will result in more uniformly blown articles; and, to provide such an apparatus which is simple in construction and operation and well adapted for its intended use.

Other objects and advantages of the present invention will become apparent from the following detailed description taken in connection with the accompanying drawings wherein are set forth by way of illustration and example certain embodiments of the present invention.

Figure 1:
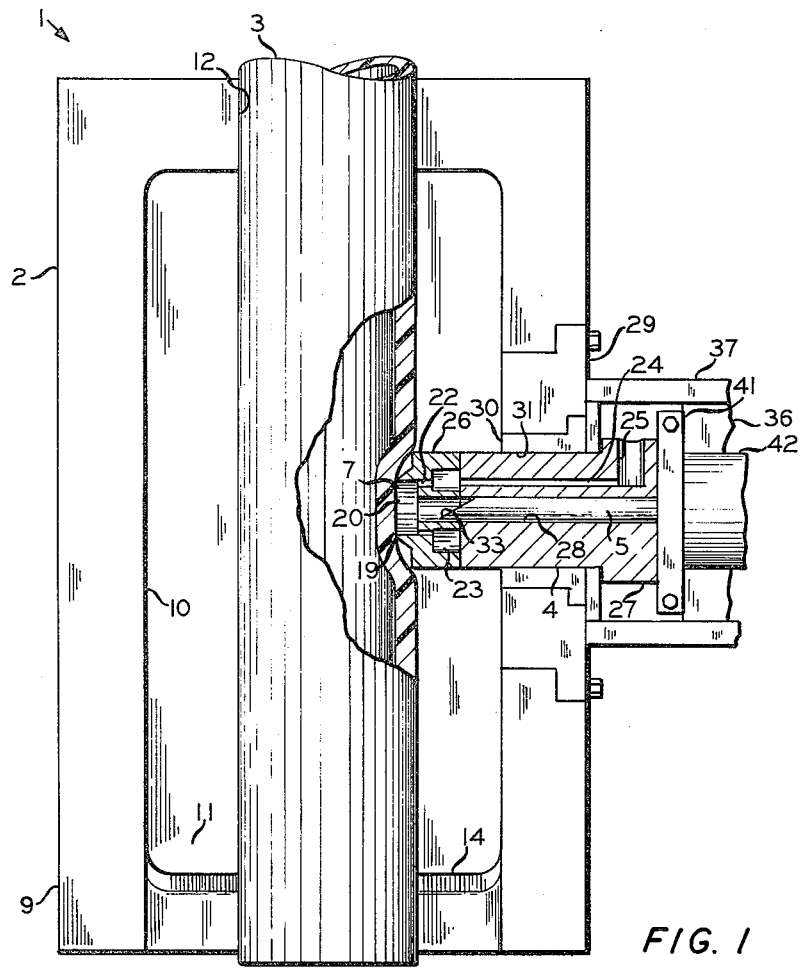
FIG. 1 is a side-elevational view of a blow mold having a mandrel in an extended position and engaging a parison and the blow needle in a retracted position.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

The reference numeral 1 designates generally a blow molding apparatus which includes a blow mold 2 which is adapted to receive a portion of a parision 3 between portions thereof. A mandrel 4 is reciprocably carried by portions of the mold 2. A blow needle 5 is reciprocably mounted in the mandrel 4 and preferably is independently movable relative thereto. Means 6 are provided to effect movement of the mandrel and the blow needle. The mandrel 4 has a vacuum surface area portion 7 which is engageable with a portion of the parison 3 so as to hold the parison in engagement with the mandrel 4 to facilitate puncturing of the parison by the blow needle 5.

The blow mold 2 is of generally standard construction and is preferably comprised of two mold halves 9 (one of which is not shown) each with a cavity defining surface 10 therein. The cavity 11 can be of any suitable shape or size and it is to be noted that the present apparatus is particularly adapted for use in larger molds to make larger blown articles say, for example, articles of 1 gallon capacity or larger. As shown, the parison 3 extends from the outside of one side of the mold adjacent an extruder to the outside of an opposite side of the mold. In the form shown, the side of the mold 2 adjacent the extruder has an opening 12 therethrough for receiving the parison 3 and the opposite side of the mold has a pinched-off area 14 to seal the end of the parison as is known in the art. The mold 2 is mounted suitably on portions of a blow molding machine (not shown) as is known in the art whereby the molding machine effects movement of the two mold halves 9 relative to one another.

The mandrel 4 is of any suitable construction and as shown is generally round in cross-section having opposite ends 16 and 17 with the end 17 being preferably enlarged and having a shoulder-forming portion 18. The end 16 is a free end and is positioned within the cavity 11 at a position depending upon the position of the mandrel 4. The end 16 has a suitable vacuum surface area portion, i.e., an area in which vacuum can be induced to firmly urge the parison 3 into engagement with a portion of the end 16. Any suitable vacuum surface area portion can be provided such as a porous metal insert or the like and, as shown, the vacuum surface area portion 7 is defined by a ridge or rib 19 extending outwardly from the end 16 and has a recess within the periphery thereof. One or more openings 22 communicate with the recess 20 so as to provide passageway for the vacuum to be induced in the recess 20. As shown, a circumferential groove 23 communicates with the openings 22 which in turn has an elongate passage 24 communicating therewith and connected to a suitable vacuum inducing device (not shown). The passage 24 as shown extends substantially the length of the mandrel 4 and opens into a passage 25 such as a threaded opening for connection to the vacuum source. Preferably, the mandrel 4 is of a two-piece construction having an end portion 26 suitably secured to a second mandrel portion 27 to facilitate manufacture of the mandrel 4. As shown, an elongate bore 28 extends axially through the mandrel 4 and opens on the end 16 preferably in a central location having the ridge 19 circumscribing same. The mandrel 4 is suitably reciprocably carried by the blow mold 2 and can be either carried by one mold half in any suitable position or, as shown, can be carried by a mold half at the parting line thereof. As shown, a mold insert 29 is secured in a recess of the mold half 9 and has a bearing member 30 sleeved therein with the mandrel 4 being movably mounted in the bearing 30 as within a bore 31. It is to be noted, however, that the mandrel 4 can be mounted at other positions in the mold other than at the parting line of the mold halves.

The blow needle 5 can be of any suitable construction as is known in the art and is hollow to form a conduit for the flow of blow air therethrough and has a sharpened end portion 33 adapted to puncture the wall of the parison 3. The blow needle 5 is reciprocably carried by the mandrel 4 and as shown is received within the elongate bore 28 and is movable therein, preferably independently of movement of the mandrel 4.

Figure 3:
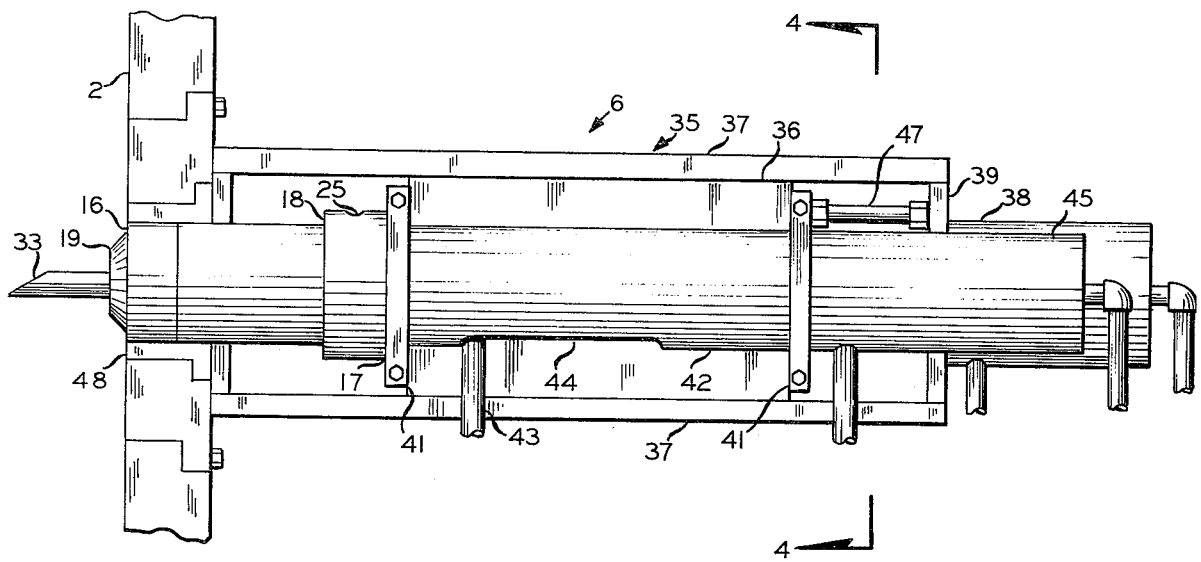
FIG. 3 is a side-elevation view of means used to move the mandrel and blow needle.
Figure 4:
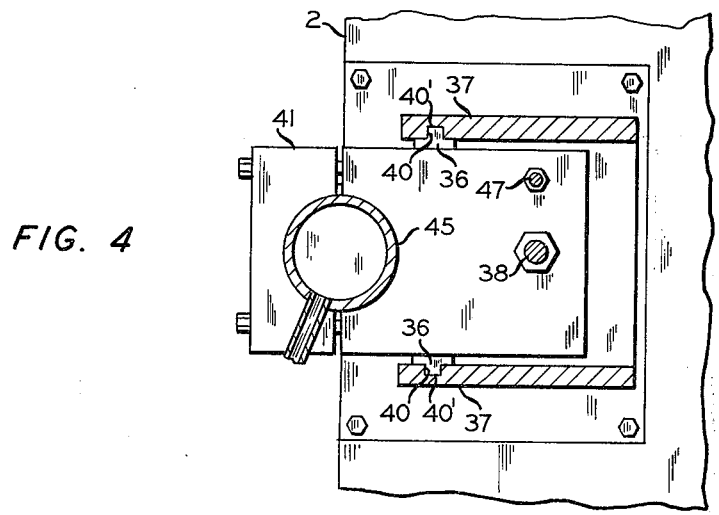
FIG. 4 is a section view taken along the line 4—4 FIG. 3.

The means 6 can be of any suitable type which is operable to effect movement of the mandrel 4 and the blow needle 5, relatively independently of one another. As shown, the means 6 includes a support structure 35 which is preferably secured to the insert 29, as is best seen in FIG. 3. The support extends from the insert 29 and has a slide member 36 movably mounted thereon such as by having guideways or grooves 40 in the plates 37. The grooves receive tongue portions 40' of the slide 36 to form a bearing and guide arrangement for the slide 36. Means are provided to effect movement of the slide 36 and in the illustrated structure, the means includes and extendable ram 38, preferably a double acting air cylinder, which has the rod portion suitably secured to the slide 36 with the ram being secured to a plate 39 of the support 35. Extension and retraction of the ram 38 effects reciprocating movement of the slide 36. Mounting brackets 41 are suitably secured to the slide 36, and a housing 42 which contains a portion of the blow needle 5 is suitably carried by the brackets 41 whereby the housing 42 is movable with the slide 36. Preferably, the mandrel 4 is suitably secured to a bracket 41 and is movable therewith in response to movement of the slide 36. The housing 42 has an opening 44 which is elongate and has an airline connection 43 extending therethrough for connection to a suitable supply of compressed air for use in the blowing process. The opening 44 has a length sufficient to accommodate the necessary length of movement of the blow needle 5. Means are provided for effecting movement of the blow needle 5 independent of the mandrel 4 and, as shown, the means include an extendable ram 45 which preferably is a double acting air cylinder which has the blow needle 5 suitably secured to the rod portion thereof (not shown) whereby extension and retraction of the ram 45 effects movement of the blow needle from an extended position for puncturing the parison 3 and a retracted position within the mandrel 4. Preferably, an adjustable stop 47 is provided to adjust the amount of retraction of the ram 38 so that the end 16 of the mandrel 4 can be adjusted in relation to a portion of the cavity-forming surface 10 which, as shown, is partially defined by a surface portion 48 of the bearing 30 and insert 29. Forward movement of the slide 36 and, hence, forward movement of the mandrel 4 can be limited by either the stroke of the ram 38 or engagement of a portion of the slide 36 with a portion of the support 35. Movement of the blow needle 5 is limited as by the length of the stroke of the ram 45. Movement of the slide 36 effects movement of both the mandrel 4, blow needle 5 and ram 45 while extension and retraction of the ram 45 effects movement of the blow needle 5 relative to the mandrel 4.

Figure 2:
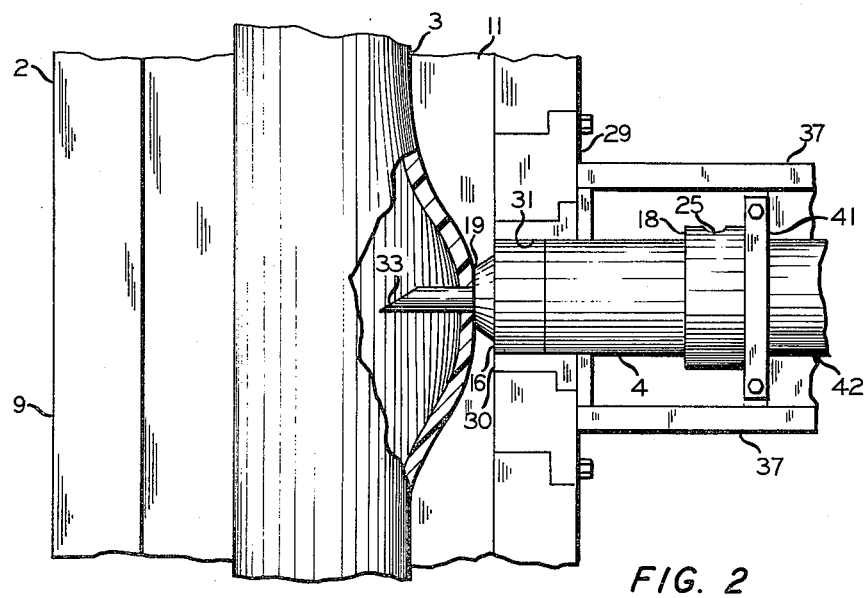
FIG. 2 is a view similar to FIG. 1 showing the blow mold with the mandrel in a retracted position and the blow needle in a position puncturing the parison.

The present invention is more fully understood by a description of the operation thereof. A freshly extruded parison 3 which is hot and lacking in rigidity and thereby support, is extruded so as to be within the mold 2. The mold halves 9 are closed by moving them into engagement with one another whereby the free end of the parison 3 is engaged by a pinch-off area 14 to seal same. After closing of the mold halves 9, the ram 38 is extended thereby moving the mandrel 4 into the mold cavity whereby the ridge 19 is in engagement with a portion of the parison 3. To retain a portion of the parison from movement, a vacuum is effected in the vacuum surface area portion 7 as in the recess 20 to maintain the parison 3 in engagement with the ridge 19 providing support for a portion thereof after which the blow needle 5 is moved to an extended position by extension of the ram 45 to puncture the wall of the parison 3. After puncturing and either during retraction of the mandrel 4 or after same has been fully retracted to the retracted position as shown in FIG. 2, blow air is introduced through the blow needle to inflate the parison 3 and form a container within the mold 2. After blowing is completed, the blow needle 5 is retracted by retraction of the ram 45 after which the mold 2 is opened and the blown part is removed therefrom.

It is to be understood that while I have illustrated and described certain forms of my invention, it is not to be limited to the specific form or arrangement of parts herein described and shown.

What is Claimed and Desired to be Secured by Letters Patent is:

1. A blow molding apparatus comprising:
   a. means forming a blow mold with relatively movable mold portions, and having a cavity for forming a blown article;
   b. a mandrel cooperating with portions of said mold forming means and having a free end positioned in said cavity, the mandrel is movable between an extended position and a retracted position, said free end has a vacuum surface area portion adapted for selective engagement with a portion of a parison; and
   c. a blow needle reciprocably mounted in said mandrel and selectively moveable between a first position for puncturing the parison and a second retracted position, said blow needle is movable independently of said mandrel.

2. The apparatus as set forth in claim 1 wherein:
   a. said blow mold forming means includes two mold halves with each having a cavity portion therein;
   b. means forming an opening extending through a portion of at least one of said mold halves with the opening communicating with said cavity; and
   c. said mandrel is reciprocably mounted in said opening and is selectively movable therein.

3. The apparatus as set forth in claim 1 including:
   a. a rib on said free end extending therefrom and surrounding at least a portion of said vacuum surface.

4. The apparatus as set forth in claim 1 including:
   a. a support secured to portions of said blow mold forming means;
   b. a first ram carried by said support and cooperating with said mandrel to effect movement thereof; and
   c. a second ram carried by said support and cooperating with said blow needle to effect movement thereof.

5. A blow molding apparatus comprising:
   a. a blow mold having two mold halves with each having a cavity portion therein;
   b. a bore extending through a portion of said blow mold and opening into said cavity;

c. a mandrel reciprocably received in said bore and movable between an extended position and a retracted portion, said mandrel has a free end which is in said cavity when said mandrel is in its extended position, said free end has a vacuum surface area portion adapted for selective angagement with a portion of a parison, a second bore extends through a portion of said mandrel and opens on said free end;

d. a blow needle reciprocably mounted in said second bore and is selectively movable independently of said mandrel between a first position for puncturing the parison and a second retracted position; and e. means cooperating with said mandrel and said blow needle to effect movement thereof.

6. The apparatus as set forth in claim 5 including:

a. a rib on said free end extending therefrom, said rib surrounds at least a portion of said vacuum surface and circumscribes said blow needle.

* * * * *